UNITED STATES PATENT OFFICE.

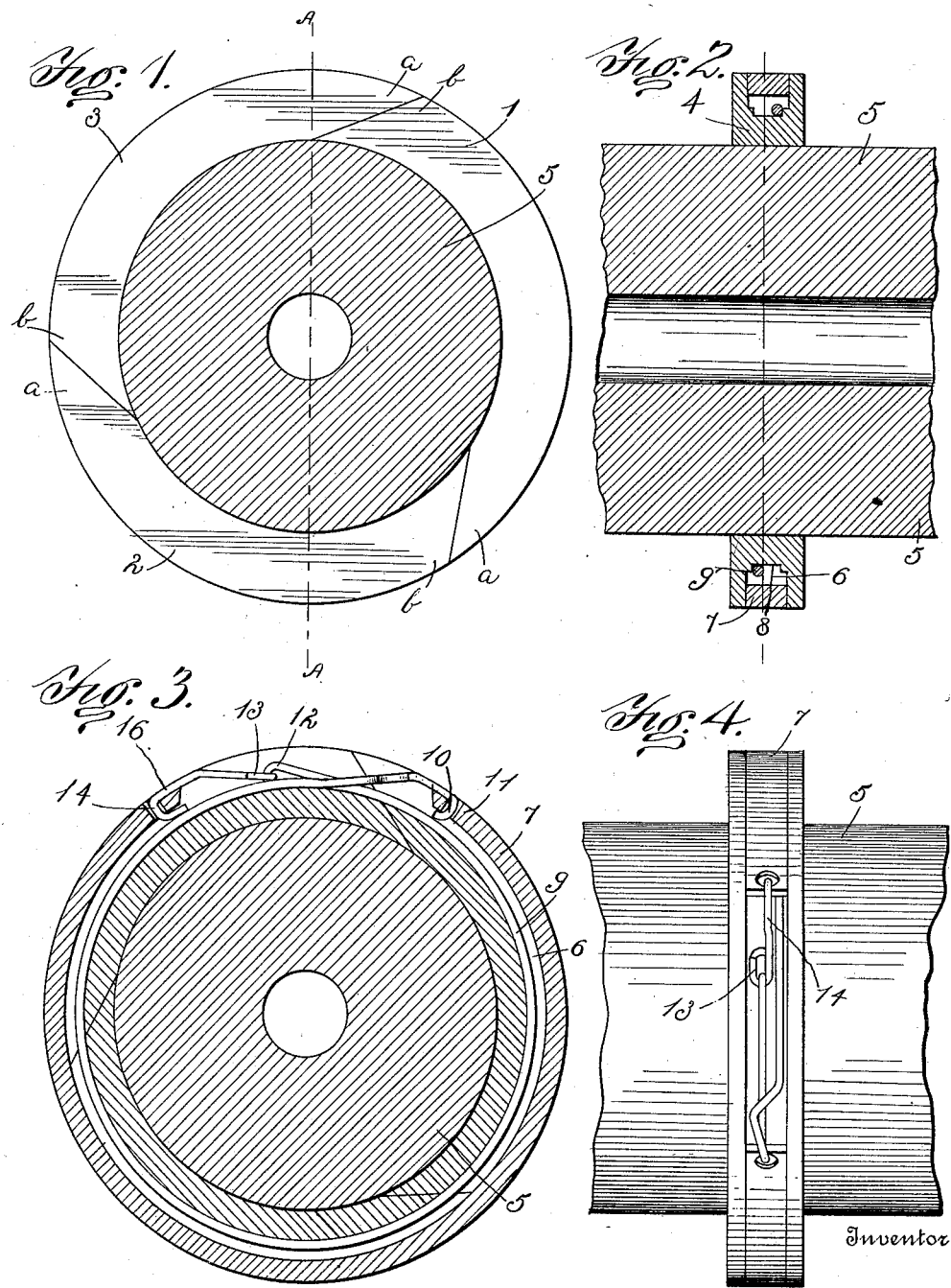

RICHARD H. MATTERS, OF PITTSBURGH, PENNSYLVANIA.

EXPANSIBLE METALLIC PACKING.

1,053,194. Specification of Letters Patent. Patented Feb. 18, 1913.

Application filed March 28, 1911. Serial No. 617,418.

*To all whom it may concern:*

Be it known that I, RICHARD H. MATTERS, citizen of the United States, residing at Pittsburgh, in the county of Allegheny and State of Pennsylvania, have invented certain new and useful Improvements in Expansible Metallic Packing, of which the following is a specification.

This invention relates to improvements in expansible metallic packing and the object thereof is to provide a packing more especially adapted to be used in connection with internal combustion engines which will not be affected by the great heat generated therein.

With the above and other objects in view, I have invented the packing illustrated in the accompanying drawings in which, Figure 1 is a side elevation of my improved packing mounted upon a shaft, the latter being shown in section, Fig. 2 is a sectional view taken on line A—A of Fig. 1, Fig. 3 is a sectional view taken on line B—B of Fig. 2, and Fig. 4 is an edge view of my packing device.

Referring to the accompanying drawings 1, 2 and 3 are spliced sectional members, the ends of which are beveled and seated upon one another so as to form a ring. Packing 4 is mounted upon a shaft 5, the peripheral edge of this packing is provided with a circumferential groove 6 in which a cast iron band spring 7 is adapted to seat, there being sufficient space between the inner surface of the band spring and the lower wall 8 of the groove for a flexible annealed wire 9, which is a method of applying tension of cast iron band spring, the one metal which will maintain its tension under the great heat in internal combustion engines and be sufficient to draw the wire more tightly as the packing rings wear away. One end 10 of this wire is secured to the end 11 of the spring 7 the other end 12 of which engages the eye 13 of the link 14 and the end 15 of which is secured to the end 16 of said band spring. This connection is such that the cast iron band spring may readily expand and apply tension through flexible wire 9 to the lower wall of groove 8 and will cause the packing to adjust itself to the piston rod 5 in Fig. 2. This method allows band spring at ends 11 and 16 to be swung over said piston rod in order to get said spring on without dismembering that part of the engine.

I claim and desire to secure by Letters Patent:—

1. An expansible metallic packing comprising a ring of packing surrounding an annular member, a band spring seated in said packing and fitting flush with its periphery, the ends of said band being spaced apart, flexible wire encircling said packing below said band spring, and means disposed in the interspace between the ends of said band spring for securing the ends of said wire to the ends of said band.

2. A device of the kind described comprising a sectional ring of packing, said ring formed with a circumferential groove, a flexible wire encircling the bottom of said groove, a band spring fitting said groove and having its ends spaced apart, and means disposed in said groove connecting the ends of said wire to the ends of said band spring.

3. In combination with a packing annulus, a flexible wire encircling said annulus and being seated loosely therein, and an expansible split band spring seated snugly in said packing annulus adapted to put said wire under tension.

4. In combination with a packing annulus having a circumferential groove, a flexible wire seated at the bottom of said groove and encircling said packing, a band spring seated in said groove above said wire and having its ends spaced apart, offsets formed on the ends of said wire, one of said offsets engaging one end of said band spring, and means carried by the opposite end of said band, within said band, engaging the other offset to enable said wire to be drawn taut.

5. A device of the kind described comprising a packing annulus having a circumferential groove, a flexible wire seated at the bottom of said groove, and encircling said packing, a band spring seated in said groove above said wire having its ends spaced apart, reduced portions formed upon the ends of said band spring, each reduced portion formed with an opening, a hook formed upon one end of said wire engaging one of said openings and overlying one reduced portion to be flush with the periphery of said packing, a hook formed on the other end of said wire, and a link having an offset engaging the other opening and overlying the other reduced portion, to be flush with the periphery, and having an eyelet engaging said last-named hook.

In testimony whereof I affix my signature in presence of two witnesses.

RICHARD H. MATTERS.

Witnesses:
 JOHN S. BOLLINGER,
 THOMAS CARLIN.

Copies of this patent may be obtained for five cents each, by addressing the "Commissioner of Patents, Washington, D. C."